(12) United States Patent
Briggs et al.

(10) Patent No.: US 7,237,176 B2
(45) Date of Patent: Jun. 26, 2007

(54) PARTITIONING DATA FOR ERROR CORRECTION

(75) Inventors: Theodore Carter Briggs, Plano, TX (US); Jay Tsao, Plano, TX (US); Chris Michael Brueggen, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 615 days.

(21) Appl. No.: 10/756,447

(22) Filed: Jan. 12, 2004

(65) Prior Publication Data

US 2005/0160329 A1 Jul. 21, 2005

(51) Int. Cl.
*G11C 29/00* (2006.01)
*H03M 13/00* (2006.01)

(52) U.S. Cl. .................................................. 714/767
(58) Field of Classification Search ................. 714/767
See application file for complete search history.

(56) References Cited

U.S. PATENT DOCUMENTS 5,734,664 A * 3/1998 Saxena ...................... 714/766
6,751,769 B2 * 6/2004 Chen et al. ................. 714/767

\* cited by examiner

*Primary Examiner*—Shelly Chase (57) ABSTRACT

Reading and writing data from a plurality of memory devices. A code word having a plurality of bits is partitioned into nibbles. Adjacent nibbles are stored on a common physical medium. The failure of the common physical medium results in errors in adjacent nibbles of a reconstructed code word.

19 Claims, 5 Drawing Sheets

PARTITIONING DATA FOR ERROR CORRECTION

FIELD OF THE INVENTION

The present invention relates to error correction and, more particularly, to partitioning data for error correction.

BACKGROUND

Error codes are commonly used in electronic systems to detect and/or correct data errors, such as transmission errors or storage errors. One common use of error codes is to detect and correct errors with data stored in a memory of a computer system. For example, error correction bits, or check bits can be generated for data prior to storing data to one or more memory devices. The error or correction bits are appended to the data to provide a data structure that is stored in memory. When the data is read from the one or more memory devices, the check bits can be used to detect or correct errors within the data. Errors can be introduced, for example, either due to faulty components or noise in the computer system. Faulty components can include faulty memory devices or faulty data paths between the devices within the computer system, such as faulty pins.

Error management techniques have been developed to mitigate the effects associated with these errors. One simple technique used for personal computers is known as parity checking. Parity checking utilizes a single bit associated with a piece of data to determine whether there is a single bit error in the data. Parity checking cannot detect multiple bit errors and provided no means for correcting errors. A more sophisticated system, such as a server, uses error correction codes (ECCs) to detect and correct some errors. An error correction code (ECC) consists of a group of bits, or codes, associated with a piece of data. A typical ECC system may use eight ECC bits (check bits, correction bits) for a 64-bit piece of data. The ECC bits provide enough information for an ECC algorithm to detect and correct a single bit error, or to detect double bit errors.

One error correction feature employed by servers is referred to in the industry as chipkill. The term chipkill refers to the ability to correct multiple bit errors in memory, where multiple bit errors are based on the width of the memory device. For example, for a 32 Mbit dynamic random access memory (DRAM) device that is 4 bits wide, a system that supports a chipkill function would be able to correct a 4-bit wide error in the memory device. Thus, the failure of an entire DRAM chip during a DRAM cycle (e.g., read operation, write operation) organized into a 4-bit width configuration that supports chipkill would not cause the system to fail. Chipkill allows a system to operate in the event of multiple bit errors in any one memory device.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some general concepts of the invention in a simplified form as a prelude to the more detailed description that is presented later.

In one embodiment, the invention encompasses a method of writing to a plurality of memory devices of a memory system. A code word to be stored in the memory system is received and partitioned into a plurality of nibbles. The nibbles have a bit width that corresponds to widths of the plurality of memory devices. The partitioned code word is stored into the plurality of memory devices by storing a plurality of successive nibbles of the block of data into each of the plurality of memory devices.

In another embodiment, the invention encompasses a method of reading from a plurality of memory devices of a memory system. A plurality of chunks of data are read from the plurality of memory devices where each chunk comprises a nibble from each of the plurality of memory devices and the nibbles have a width corresponding to a width of one or more corresponding memory devices. The nibbles from the plurality of chunks are combined to generate a code word where the nibbles from each of the plurality of memory devices are adjacent in the code word.

In yet another embodiment, the invention encompasses a memory system. A data buffer reads and writes chunks of bits from a plurality of memory devices. A data combiner receives the chunks of bits read by the buffer and forms a code word by separating the chunks into a plurality of nibbles having widths corresponding to at least one of the memory devices and arranging the nibbles having the same relative position in their respective chunks adjacent to each other in the code word. A data separator receives a code word and separates the code word into a plurality of chunks for storage by the buffer into the memory devices. The data separator partitions the code word into a plurality of sequential nibbles with widths corresponding to the width of at least one of the plurality of memory devices, partitions the nibbles into groups of adjacent nibbles, and generates the chunks of bits having only one nibble from each group of nibbles with the nibbles of each group in the same relative position in their respective chunks.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

The present invention relates generally to systems and methods for detecting and correcting errors in code words. A code word comprising a plurality of error detection and correction bits and data bits is partitioned into nibbles. Nibbles adjacent to each other in the code word are transmitted and/or stored on a common physical transmission or storage medium. In the case of a failure of the common physical medium, when the code word is reconstructed from the physical medium, the failure causes errors in adjacent nibbles. In other words, the bits in the code word that are erroneous due to the failure of the common physical medium form a contiguous string in the code word.

An error correction code may be configured to correct more erroneous bits if the bits are adjacent to each other rather than if they are dispersed (not adjacent) through a code word. By partitioning the data according to an embodiment of the invention, is may be possible to correct the erroneous bits resulting from the failure of the common physical medium with less overhead of error detection and correction bits.

Figure 1:
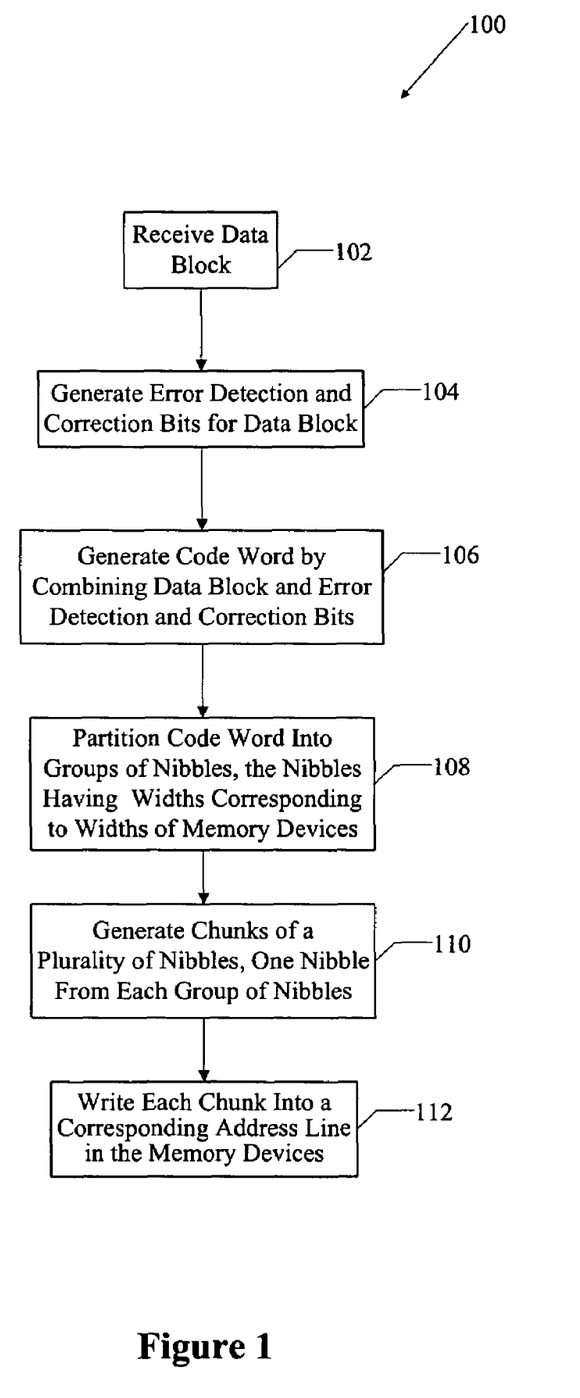
FIG. 1 is a flow chart illustrating a method for writing a data block into a memory system according to an embodiment of the invention.

Referring to the drawings, in which like reference numerals indicate like elements, a method of writing to a plurality of memory devices according to an embodiment of the invention is described with reference to the flow chart 100 of FIG. 1 and the memory system 200 shown in FIG. 2.

The error detection and correction module 210 receives a data block in step 102. The error detection and correction module 210 generates error detection and correction bits from the data block in step 104 and combines the data block and the error detection and correction bits to form a code word in step 106. The data separator 208 receives the code word and partitions it into nibbles having bit widths corresponding to the bits widths of the memory devices 202 and partitions the nibbles into groups of adjacent nibbles in step 108. The number of nibbles in a group equals the bit width of the code word divided by the bit width of an address line across the memory devices.

The data separator 208 generates chunks of nibbles having one nibble from each group of nibbles in step 110. The buffer 204 receives the chunks of nibbles and stores them in the memory devices 202 in step 112 so the nibbles in each group are stored in the same memory device 202.

Figure 3:
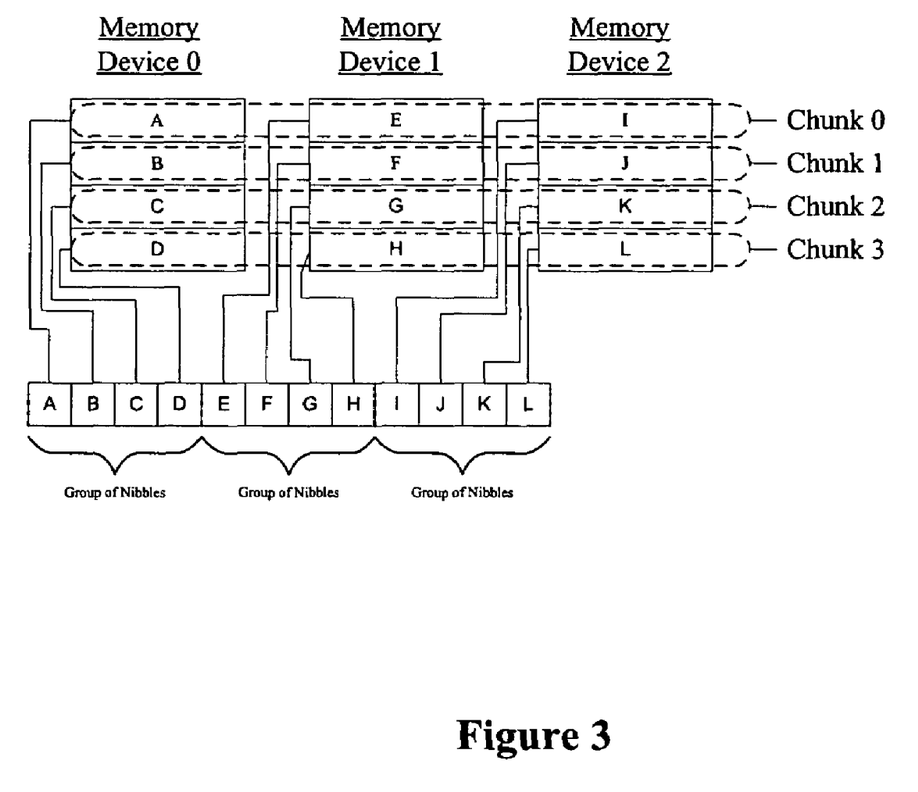
FIG. 3 is a block diagram illustrating storage of nibbles in a memory system according to an embodiment of the invention.

The method described above with regard to FIG. 1 is illustrated in an example with reference to the code word and memory devices shown in FIG. 3. The code word shown in FIG. 3 has twelve nibbles A-L and there are three memory devices 0-2 where each memory device has a bit width equal to the bit width of a nibble. The nibbles are formed into groups of four adjacent nibbles per group as illustrated in FIG. 3. Four chunks labeled 0-3 are formed where each chunk has one nibble from each group and is written to an address line in the memory devices 202 as illustrated in FIG. 3.

By partitioning the code word as illustrated in FIG. 3, if memory device 1 fails, the resulting code word read from the memory devices will be [A,B,C,D,X,X,X,X,I,J,K,L] where the X's designate erroneous nibbles (i.e., nibbles having errors due to the failure of memory device 1). The erroneous nibbles are adjacent to each other in the reconstructed code word and may therefore be correctable with an error code that uses less correction bits than might be necessary to correct four erroneous nibbles that are not adjacent.

Figure 4:
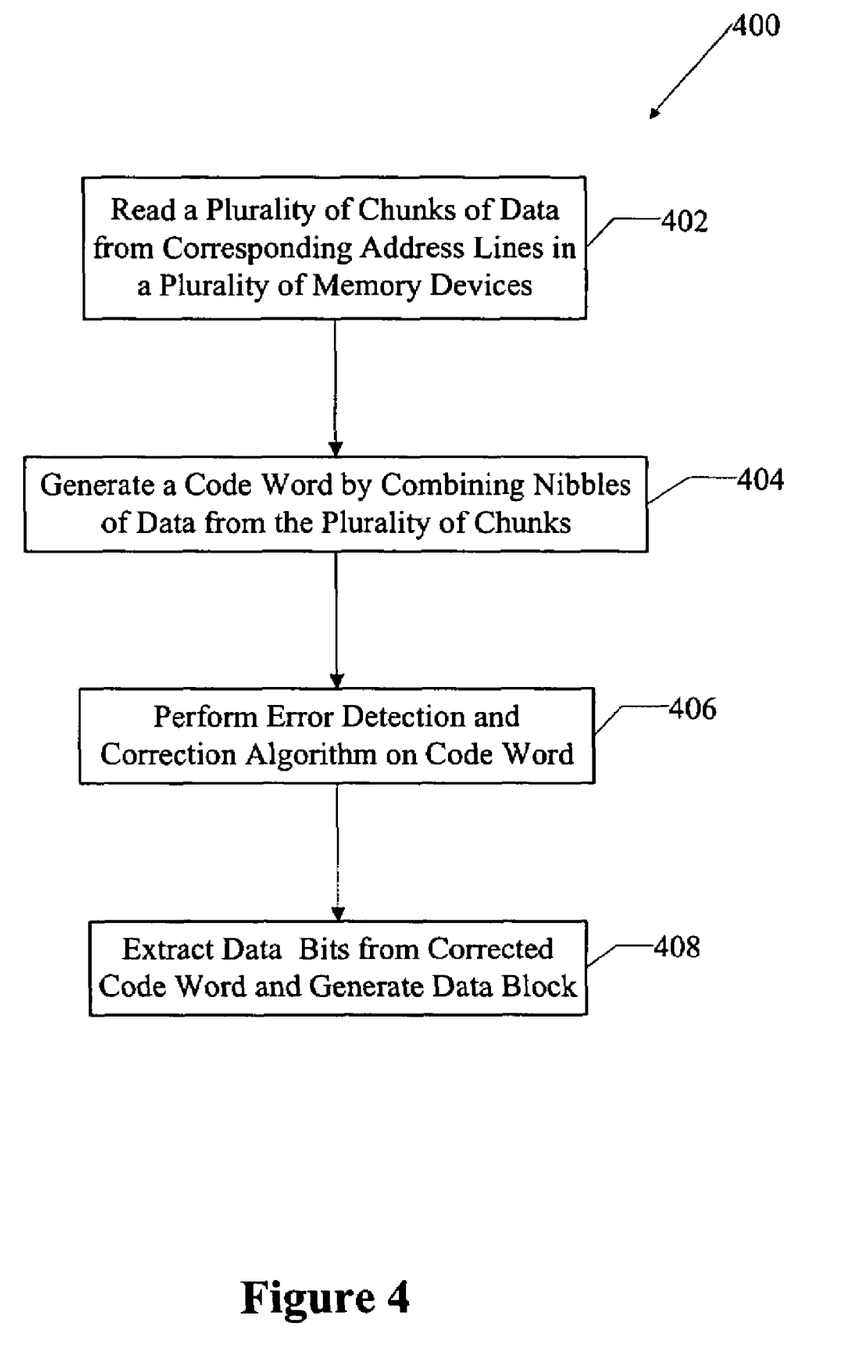
FIG. 4 is a is flow chart illustrating a method for reading a data block from a memory system according to an embodiment of the invention.

A method of reading a code word from a plurality of memory devices according to an embodiment of the invention is described with reference to the flow chart 400 of FIG. 4 and the memory system 200 shown in FIG. 2. The buffer 204 reads a plurality of chunks from the memory devices 202 in step 402 where each chunk includes a nibble from each of the plurality of memory devices 202, the nibble having a bit width corresponding to the width of the corresponding memory device 202.

The data combiner 206 receives the plurality of chunks from the buffer 204 and generates a code word from the nibbles in the plurality of chunks in step 404. The nibbles are positioned in an order in the code word so the nibbles from each of the plurality of memory devices are adjacent in the code word. The error detection and correction module 210 receives the code word and performs an error detection and correction algorithm on the code word to detect and/or correct errors in the code word. The error detection and correction module 210 then extracts the data bits from the code word and outputs a corresponding data block.

With reference to the exemplary code word and memory devices of FIG. 3, a code word is read from the memory devices as follows. In this example, a code word is formed from four chunks (labeled 0-3) of nibbles. The buffer 204 reads the four chunks from the memory devices where the chunks and their corresponding nibbles are identified as follows.

| Chunk | Nibbles |
|---|---|
| Chunk 0 | [A, E, I] |
| Chunk 1 | [B, F, J] |
| Chunk 2 | [C, G, K] |
| Chunk 3 | [D, H, L] |

The data combiner 206 receives the four chunks of nibbles from the buffer 204 and reconstructs their nibbles into order from A-L to form the code word. The code word is then further processed by the error detection and correction module 210 in steps 406 and 408 as described above.

The examples illustrated with regard to FIG. 3 are for illustrative purposes only and the invention is generally applicable to other configurations of code words, nibble, chunks, and memory devices. Another example is illustrated with reference to FIG. 5 where a code word has a number CW of bits and the memory system includes a number K of memory devices each having a number W of bits in width. An address line across the plurality of K memory devices includes a number MD of bits, in this case MD=K*W bits, because the K memory devices all have the same bit width W. The number CW of bits in the code word is a multiple of the size MD of the address line.

Figure 5:
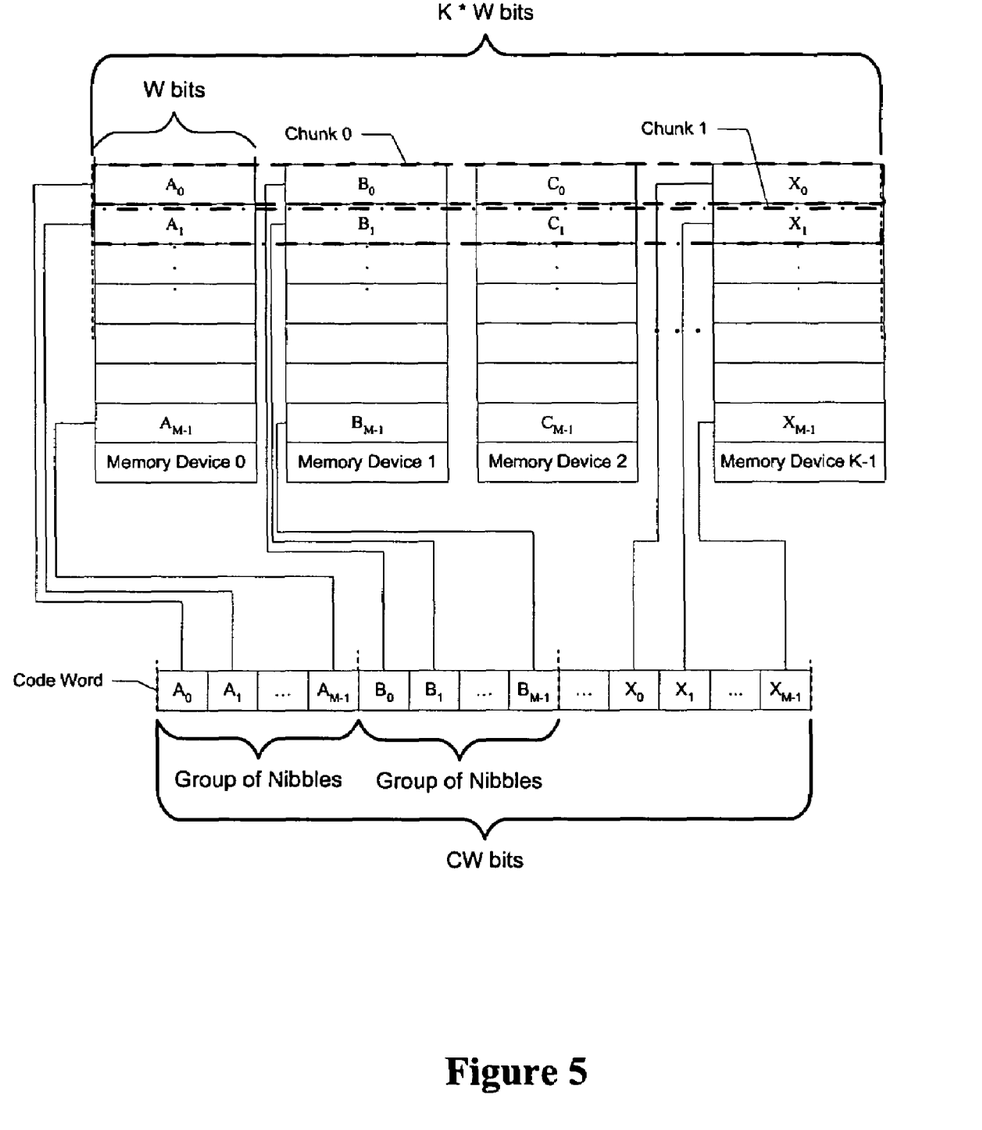
FIG. 5 is a block diagram illustrating storage of nibbles in a memory system according to embodiments of the invention.

A code word to be written to the memory devices is partitioned by the data separator 208 into a number N of nibbles each having W bits where N=(CW/W) and the nibbles are sequentially numbered from 0 to N−1. The nibbles are partitioned into a number M of chunks where M=(CW/MD) and each chunk includes K nibbles defined as follows:
Chunk[C]={nibble[C+(K−1)*M], nibble[C+(K−2)*M], . . . . . . , nibble[C+(1)M], nibble[C+(0)*M]}
for C=0, 1, . . . M−1.

A code word to be read from memory is formed by reading M=CW/MD chunks from the K memory devices where each chunk comprises one nibble having a width W from each of the memory devices. The data combiner 206 arranges the nibbles to form a code word where the nibbles from each memory device are adjacent as follows:
Code Word=[nibble(M−1,K−1), nibble (M−2,K−1), . . . , nibble(0,K−1),
nibble(M−1,K−2), nibble (M−2,K−2), . . . , nibble(0,K−2),
nibble(M−1,0), nibble (M−2,0), . . . , nibble(0,0)]
where each nibble is designated as nibble(x,y) where x is its chunk identifier and y is its sequential position within the chunk.

In an embodiment, the system 200 includes 36 memory devices 202 with a width W of 4 bits each and the code word has a width CW of 288 bits. When writing to the memory devices 202, the data separator 208 partitions the code word into 72 sequentially numbered nibbles of 4 bits. The data separator 208 partitions the nibbles into two chunks, one with even-numbered nibbles and another with odd-numbered nibbles. The buffer 204 stores the first and second chunks in respective address lines of the 36 memory devices so each pair of adjacent nibbles from the code word is stored in a different one of the 36 memory devices.

When reading from the 36 memory devices, the buffer 204 reads two chunks of 144 bits each from the memory devices. The first chunk has 36 4-bit "first" nibbles, one from each of the memory devices. The second chunk has 36 4-bit "second" nibbles, one from each of the memory devices. The data combiner 206 combines the nibbles from the first and second chunks to generate a code word having the first and second nibbles from each memory device adjacent to each other. The error detection and correction module 210 receives the code word from the data combiner 206 and performs an error detection and correction algorithm on the code word to detect and/or correct errors in the code word. The error detection and correction module 210 then extracts the data bits from the code word and outputs a corresponding data block.

In an embodiment with the code word having 288 bits, the code word includes 24 error detection and correction bits and 264 data (or payload) bits and can correct a string of eight adjacent erroneous bits. Each memory device contributes two 4-bit nibbles to each code word which are adjacent in the code word and the system can correct for the failure of any one of the 36 memory devices, thereby achieving chipkill.

Although the exemplary embodiment is described above with regard to a system where the memory devices 202 have the same width, embodiments of the invention encompass the methods described above applied with nibbles and/or memory devices in a system having different widths. Embodiments of the invention also encompass a nibble having a bit width spanning multiple memory devices and being stored into a single address line of multiple memory devices. For example, a nibble having a bit width of 8 may be stored in two 4-bit memory devices.

Figure 2:
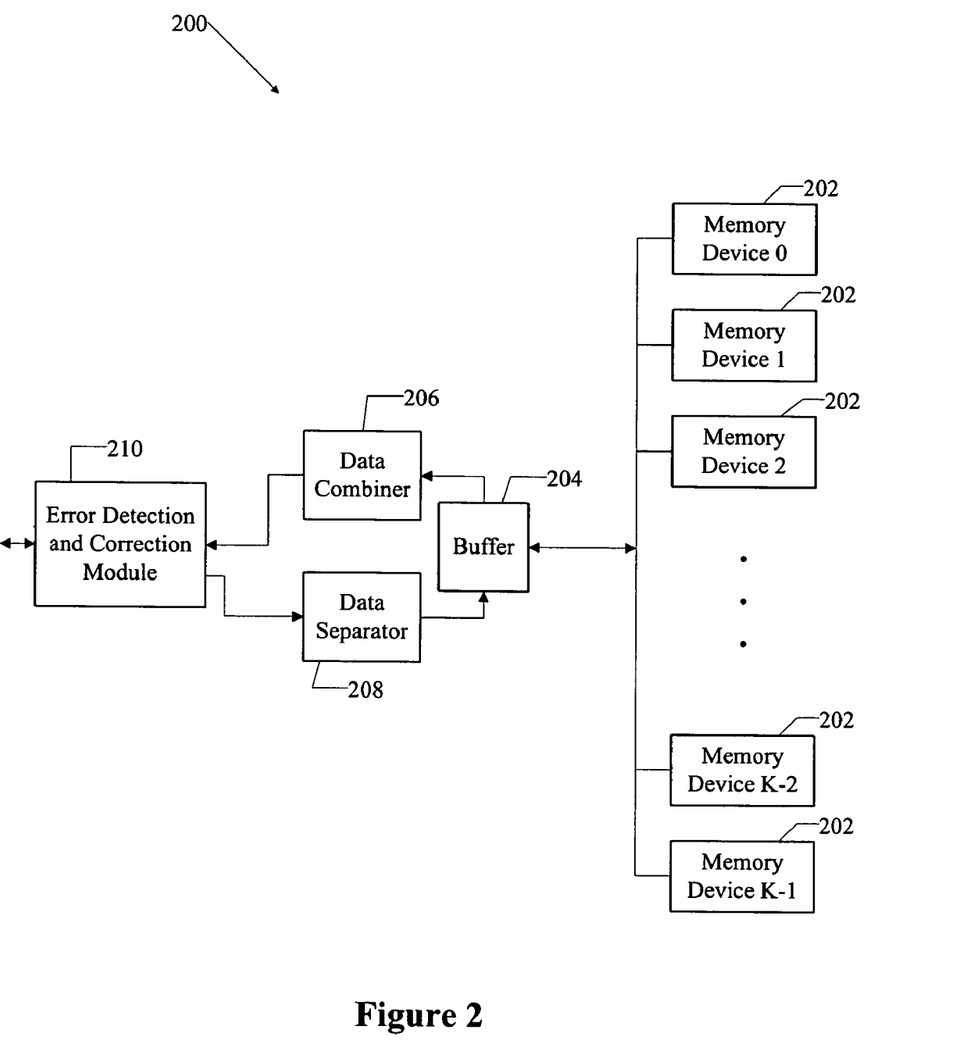
FIG. 2 is a partial block diagram of a memory system according to an embodiment of the invention.

The components of the system 200 shown in FIG. 2 are for illustrative purposes only and the invention is not limited to separate modules performing the methods of the invention. The functions of the invention may be performed by a single module or may be performed by multiple modules. For example, the functions of the data separator 208 and the data combiner may be performed by one module or the buffer 204, data separator 208, data combiner 206, and error detection and correction module 210 may be combined into a single module that performs their functions.

The memory devices 202 can be for example, but not limited to, single-in-line memory modules (SIMM), dual-in-line memory modules (DIMM) and dynamic random access memory (DRAM) modules or other types of memory devices.

The term "nibble" as used herein is not limited to any particular number of bits. A nibble is used herein to identify a number of adjacent bits where that number can vary in accordance with the methods and systems encompassed by the invention.

Although embodiments of the invention are described above with regard to reading and writing chunks from memory, the reading and writing of multiple chunks are not necessarily separate operations. Several chunks may be read from or written to memory devices in block read and write operation. In an embodiment of the invention, the chunks corresponding to a code word are all read in a single block read or are all written in a single block write to the memory devices.

The foregoing describes the invention in terms of embodiments foreseen by the inventors for which an enabling description was available, although insubstantial modifications of the invention, not presently foreseen may nonetheless represent equivalents thereto.

What is claimed is:

1. A method of writing to a plurality of memory devices of the same width of a memory system, the method comprising:
receiving a code word for storage in the memory system;
partitioning the code word into a plurality of nibbles, each nibble having a width equal to the width of each of the plurality of memory devices; and
storing the code word into the plurality of memory devices by storing a plurality of successive nibbles of the code word into a plurality of corresponding address lines in each of the plurality of memory devices.

2. The method according to claim 1 further comprising:
receiving a data block;
generating error detection and correction bits for the data block; and
combining the error detection and correction bits and the data block to form the code word.

3. The method according to claim 1 wherein the memory system comprises K memory devices each having a width W, the code word has a width CW that is a multiple of (K*W), and the method comprises:
partitioning the code word into N=(CW/W) nibbles of W bits each, sequentially numbered from 0 to N−1;
partitioning the code word into M chunks where M=(CW/(K*W)) and each chunk includes K nibbles defined as:
Chunk[C]={nibble[C+(K−1)*M], nibble[C+(K−2)*M], . . . ,
nibble[C+(1)M], nibble[C+(0)*M]}
for C=0, 1, . . . M−1; and
writing each chunk into a corresponding address line in the memory devices.

4. The method according to claim 1 wherein the memory system comprises 36 memory devices, each having a width of 4 bits, the code word comprises 288 bits, and the method comprises:
partitioning the code word into 72 sequentially numbered nibbles of 4 bits each;
forming a first chunk including the odd nibbles;
forming a second chunk including the even nibbles; and
storing the first and second chunks in respective address lines of the plurality of memory devices so each pair of adjacent nibbles from the code word is stored in a different one of the plurality of memory devices.

5. A method of reading from a plurality of memory devices of the same width of a memory system, the method comprising:
a. reading a plurality of chunks of data from a plurality of corresponding address lines in each of the plurality of memory devices, each chunk comprising a nibble from each of the plurality of memory devices having a width equal to the width of the corresponding memory device; and
b combining the nibbles from the plurality of chunks to generate a code word where the nibbles from each of the plurality of memory devices are adjacent in the code word.

6. The method according to claim 5 wherein the code word comprises data bits and error detection and correction bits and the method further comprises extracting the data bits and the error detection and correction bits from the code word.

7. The method according to claim 5 wherein the memory system comprises K memory devices each having a width W and the code word has a width CW that is a multiple of (K*W), the method comprising:
   reading M=CW/(K*W) chunks from the K memory devices where each chunk comprises one nibble having a width W from each of the memory devices; and
   arranging the nibbles to form a code word where the nibbles from each memory device are adjacent as follows
   Code Word=[nibble(M−1,K−1), nibble (M−2,K−1), ..., nibble(0,K−1),
   nibble(M−1,K−2), nibble (M−2,K−2), ..., nibble(0, K−2),
   nibble(M−1,0), nibble (M−2,0), ..., nibble(0,0)]
   where each nibble is designated as nibble(x,y) where x is its chunk identifier and y is its sequential position within the chunk.

8. The method according to claim 5 wherein the memory system comprises 36 memory devices, each having a width of 4 bits, the code word comprises two chunks of 144 bits each, and the method comprises:
   reading a first chunk having 36 4-bit first nibbles from the memory devices, each nibble from one of the memory devices;
   reading a second chunk having 36 4-bit second nibbles from the memory devices, each nibble from one of the memory devices;
   combining the first and second chunks to generate a code word having the first and second nibbles from each memory device adjacent to each other.

9. A memory system comprising:
   a. a plurality of memory devices having a width of MD bits;
   b. a data buffer for reading chunks of MD bits from and writing chunks of MD bits to an address line in the memory devices;
   c. a data separator for receiving a code word of CW bits, separating the code word into a plurality of chunks each comprising a plurality of sequential nibbles having widths corresponding to the width of at least one of the plurality of memory devices, partitioning the nibbles into groups of M adjacent nibbles where M is a value equaling CW divided by MD, and generating M chunks of bits, each chunk having only one nibble from each group of M nibbles where nibbles of each group are in the same relative position in their respective chunks; and
   d. a data combiner for generating a code word from M chunks received from the data buffer by separating the M chunks into a plurality of nibbles having widths corresponding to at least one of the memory devices and arranging M nibbles having the same relative position in their respective chunks adjacent to each other in the code word.

10. The system according to claim 9 wherein the code word comprises data bits and error detection and correction bits and the system comprises an error detection and correction component that receives code words from the data combiner, detects and corrects errors in code word, and extracts the data from the code word.

11. The system according to claim 10 wherein the error detection and correction component corrects errors from a failure of any one of the plurality of memory devices.

12. The system according to claim 9 comprising 36 memory devices each having a width of 4 bits and a code word comprises 288.

13. The system according to claim 9 wherein the data combiner and the data separator are implemented in a single module.

14. The system according to claim 9 wherein the memory devices are dynamic random access memory devices.

15. The system according to claim 9 wherein the nibbles having widths corresponding to the width of only one of the plurality of memory devices.

16. A computer readable media comprising computer readable code for instructing a computer to write data into a plurality of memory devices of the same width of a memory system comprising:
   receiving a code word for storage in the memory system;
   partitioning the code word into a plurality of nibbles, each nibble having a width equal to the width of each of the plurality of memory devices; and
   storing the code word into the plurality of memory devices by storing a plurality of successive nibbles of the code word into a plurality of corresponding address lines in each of the plurality of memory devices.

17. A computer readable media comprising computer readable code for instructing a computer to read data from a plurality of memory devices of the same width of a memory system comprising:
   reading a plurality of chunks of data from a plurality of corresponding address lines in each of the plurality of memory devices, each chunk comprising a nibble from each of the plurality of memory devices having a width equal to the width of the corresponding memory device; and
   combining the nibbles from the plurality of chunks to generate a code word where the nibbles from each of the plurality of memory devices are adjacent in the code word.

18. A system for writing data to a plurality of memory devices of the same width in a memory system comprising:
   a module for receiving a code word for storage in the memory system;
   a data separator for partitioning the code word into a plurality of nibbles, each nibble having a width equal to the width of each of the plurality of memory devices; and
   a buffer for storing the code word into the plurality of memory devices by storing a plurality of successive nibbles of the code word into a plurality of corresponding address lines in each of the plurality of memory devices.

19. A system for reading data from a plurality of memory devices of the same width of a memory system comprising:
   a buffer for reading a plurality of chunks of data from a plurality of corresponding address lines in each of the plurality of memory devices, each chunk comprising a nibble from each of the plurality of memory devices having a width equal to the width of the corresponding memory device; and
   a data combiner for combining the nibbles from the plurality of chunks to generate a code word where the nibbles from each of the plurality of memory devices are adjacent in the code word.

* * * * *

UNITED STATES PATENT AND TRADEMARK OFFICE
CERTIFICATE OF CORRECTION

PATENT NO.        : 7,237,176 B2                                      Page 1 of 1
APPLICATION NO.   : 10/756447
DATED             : June 26, 2007
INVENTOR(S)       : Theodore Carter Briggs et al.

It is certified that error appears in the above-identified patent and that said Letters Patent is hereby corrected as shown below:

In column 6, line 62, in Claim 5, delete "b" before "combining" and insert -- b. --, therefor.

Signed and Sealed this

Fifth Day of August, 2008

JON W. DUDAS
*Director of the United States Patent and Trademark Office*